United States Patent
Ogura

(10) Patent No.: US 11,005,284 B2
(45) Date of Patent: May 11, 2021

(54) ELECTRIC POWER TRANSMISSION DEVICE AND ELECTRIC POWER TRANSMISSION SYSTEM

(71) Applicant: KABUSHIKI KAISHA TOSHIBA, Tokyo (JP)

(72) Inventor: Koji Ogura, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 227 days.

(21) Appl. No.: 16/129,086

(22) Filed: Sep. 12, 2018

(65) Prior Publication Data

US 2019/0288541 A1 Sep. 19, 2019

(30) Foreign Application Priority Data

Mar. 13, 2018 (JP) .............................. JP2018-045918

(51) Int. Cl.
 *H02J 50/70* (2016.01)
 *H02J 7/02* (2016.01)

(52) U.S. Cl.
 CPC .............. *H02J 7/025* (2013.01); *H02J 50/70* (2016.02)

(58) Field of Classification Search
 CPC ................................. H02J 50/70; H02J 50/10
 See application file for complete search history.

(56) References Cited

U.S. PATENT DOCUMENTS

| 9,673,727 B2 | 6/2017 | Nishijima |
| 10,069,427 B2 | 9/2018 | Nishijima |
| 2012/0032521 A1 | 2/2012 | Inoue et al. |
| 2015/0022016 A1* | 1/2015 | Kim ........................ H02J 50/80 307/104 |

(Continued)

FOREIGN PATENT DOCUMENTS

| JP | 2010193598 A | 9/2010 |
| JP | 2015033316 A | 2/2015 |
| JP | 2017034828 A | 2/2017 |

(Continued)

OTHER PUBLICATIONS

Hongseok Kim, et al., "EMI Reduction in Wireless Power Transfer System Using Spread Spectrum Frequency Dithering", IEEE Wireless Power Transfer Conference 2016.

(Continued)

*Primary Examiner* — Daniel Cavallari
(74) *Attorney, Agent, or Firm* — Holtz, Holtz & Volek PC

(57) ABSTRACT

An electric power transmission device as one aspect of the present invention comprises: a power transmitter that generates a magnetic field; a storage; and a power transmission controller. The storage stores a first parameter set concerning frequency hopping performed on a first frequency band and a second parameter set concerning frequency hopping performed on a second frequency band. The power transmission controller controls the power transmitter such that the frequency hopping is performed based on the parameter set acquired from the storage. The first frequency band is a band (Continued)

corresponding to a first resolution bandwidth for measuring a leakage magnetic field. The second frequency band is a band corresponding to a second resolution bandwidth intended for a higher band than the first resolution bandwidth.

4 Claims, 11 Drawing Sheets

(56) References Cited

U.S. PATENT DOCUMENTS

2018/0269717 A1　9/2018　Shijo et al.
2019/0006843 A1　1/2019　Suzuki et al.

FOREIGN PATENT DOCUMENTS

| JP | 2017192281 A | 10/2017 |
| JP | 2018157614 A | 10/2018 |
| JP | 2019017134 A | 1/2019 |

OTHER PUBLICATIONS

Josep Balcells, et al., "EMI Reduction in Switched Power Converters Using Frequency Modulation Techniques", IEEE Transactions on Electromagnetic Compatibility, vol. 47, No. 3, Aug. 2005, pp. 569-576.
U.S. Appl. No. 15/916,911, filed Mar. 9, 2018, First Named Inventor: Masatoshi Suzuki, Title: "Power Transmission Device and Power Reception Device".

\* cited by examiner

ELECTRIC POWER TRANSMISSION DEVICE AND ELECTRIC POWER TRANSMISSION SYSTEM

CROSS-REFERENCE TO RELATED APPLICATION (S)

This application is based upon and claims the benefit of priority from Japanese Patent Application No. 2018-045918, filed Mar. 13, 2018; the entire contents of which are incorporated herein by reference.

FIELD

Embodiments described herein relate generally to an electric power transmission device and an electric power transmission system.

BACKGROUND

Contactless electric power transmission (contactless power supplying) from an electric power transmission device to an electric power reception device is becoming widespread. In the contactless power supplying, power is transmitted via a magnetic field generated by the electric power transmission device. However, a magnetic field having leaked outside (leakage magnetic field) might interfere with broadcasting, wireless communication, and the like.

To deal with the leakage magnetic field, frequency hopping in which a frequency of a magnetic field is shifted has been proposed. For example, there has been a report that reduction in leakage magnetic field has been achieved by cyclically shifting the frequency. There has also been a report that reduction in leakage magnetic field has been achieved by setting a cycle for shifting of the frequency based on a resolution bandwidth (RBW) of a measurement instrument used for measuring the leakage magnetic field.

However, it has been found that when the frequency hopping is performed in a high-frequency band, an expected effect cannot be obtained. For example, in an electric passenger car expected to use the contactless power supplying, a frequency bandwidth considered to be standardized is an 85-kHz band. When the cyclic frequency hopping is performed in the 85-Hz band, the result has been that a leakage magnetic field of a fundamental wave can be reduced, but a leakage magnetic field of a harmonic wave cannot be reduced.

DETAILED DESCRIPTION

Figure 1:
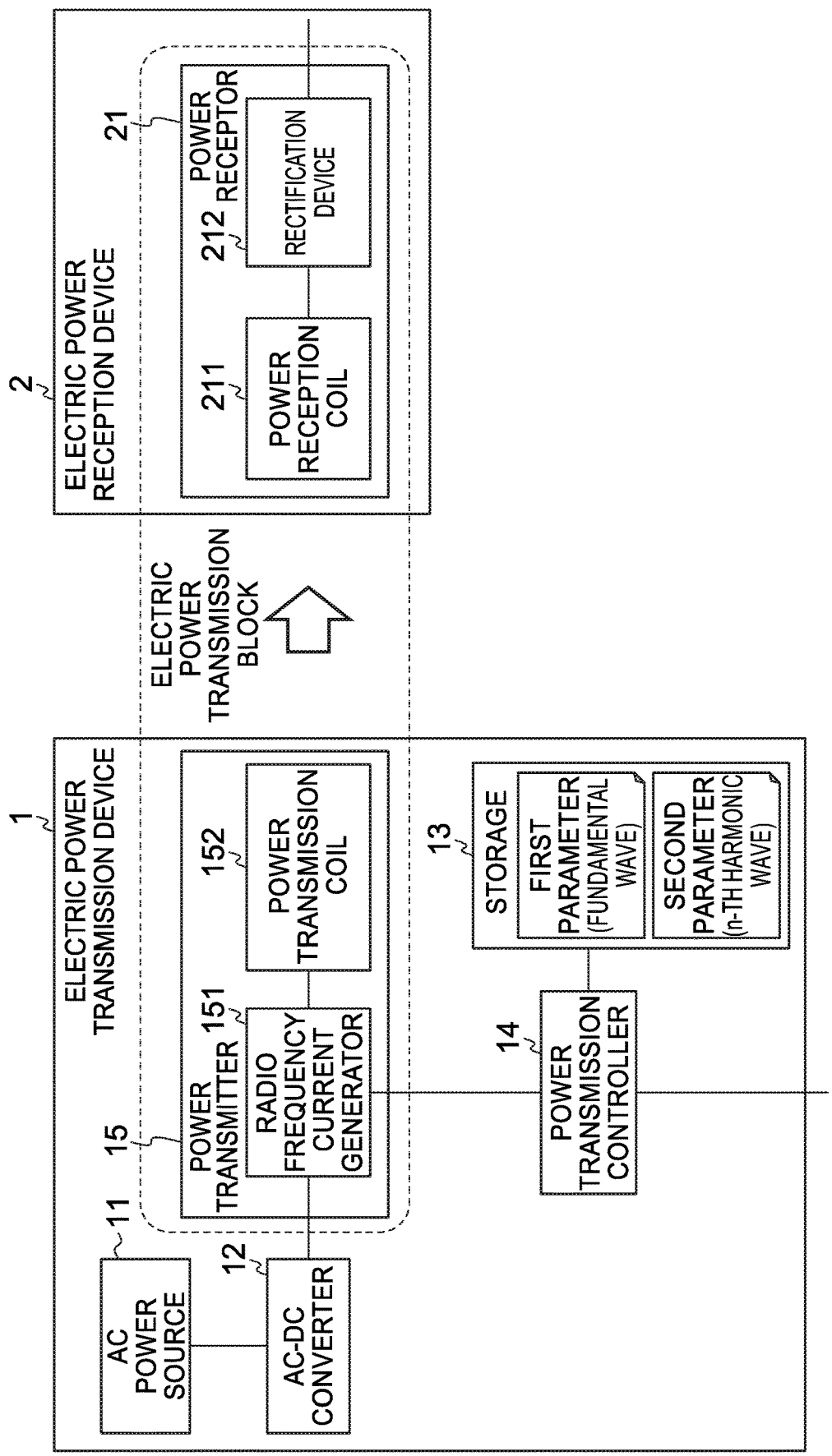
FIG. 1 is a block diagram illustrating an example of an electric power transmission system according to a first embodiment.

An embodiment of the present invention is to provide an electric power transmission device and an electric power transmission system for dealing with a case where a spread spectrum effect can be obtained only in either a fundamental wave or a harmonic wave.

An electric power transmission device as one aspect of the present invention comprises: a power transmitter that generates a magnetic field; a storage; and a power transmission controller. The storage stores: a first parameter set concerning frequency hopping performed on a first frequency band; and a second parameter set concerning frequency hopping performed on a second frequency band. The power transmission controller controls the power transmitter such that the frequency hopping is performed based on the parameter set acquired from the storage. The first frequency band is a band corresponding to a first resolution bandwidth for measuring a leakage magnetic field. The second frequency band is a band corresponding to a second resolution bandwidth intended for a higher band than the first resolution bandwidth.

Below, a description is given of embodiments of the present invention with reference to the drawings. The present invention is not limited to the embodiments.

Incidentally, alphabet indexes for the number of the drawing are given to distinguish individual items of the same number.

First Embodiment

FIG. 1 is a block diagram illustrating an example of an electric power transmission system according to a first embodiment. The electric power transmission system according to the first embodiment includes an electric power transmission device 1 and an electric power reception device 2.

The electric power transmission device 1 includes an AC (alternating current) power source 11, an AC-DC (alternating current to direct current) converter 12, a storage 13, a power transmission controller 14, and a power transmitter 15. The power transmitter 15 includes a radio frequency current generator 151 and a power transmission coil 152.

The electric power reception device 2 includes a power receptor 21. The power receptor 21 includes a power reception coil 211 and a rectification device 212.

In the electric power transmission system of the present embodiment, power is transmitted from the electric power transmission device 1 to the electric power reception device 2 by using a magnetic field. That is, in the electric power transmission system of the present embodiment, power is supplied to the electric power reception device 2 in a contactless manner.

A part of the magnetic field generated in the electric power transmission device might interfere with peripheral equipment as a leakage magnetic field. The intensity of the leakage magnetic field needs to be held within an acceptable range stipulated by law or the like. Therefore, in the present embodiment, frequency hopping is performed to spread power to each frequency in the frequency hopping, thereby holding the intensity of the leakage magnetic field within the acceptable range.

Figure 2A:
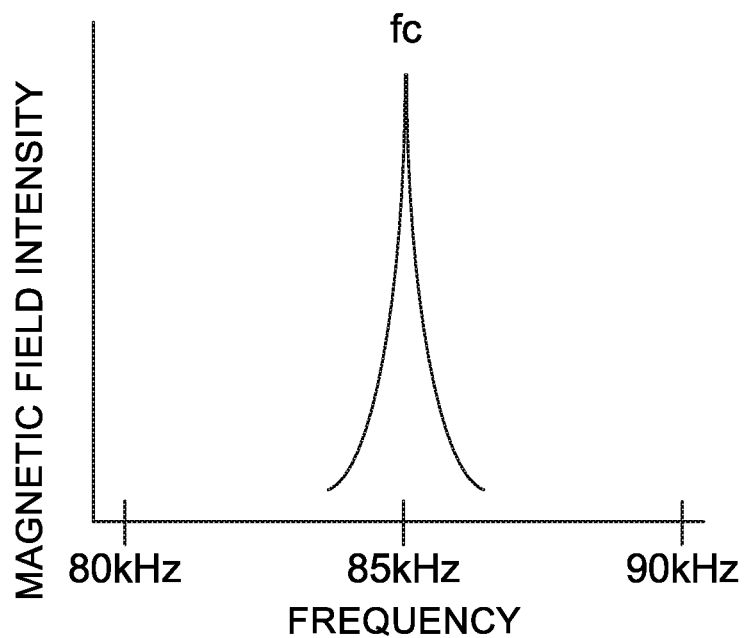
FIGS. 2A and 2B are graphs for explaining frequency hopping.
Figure 2B:
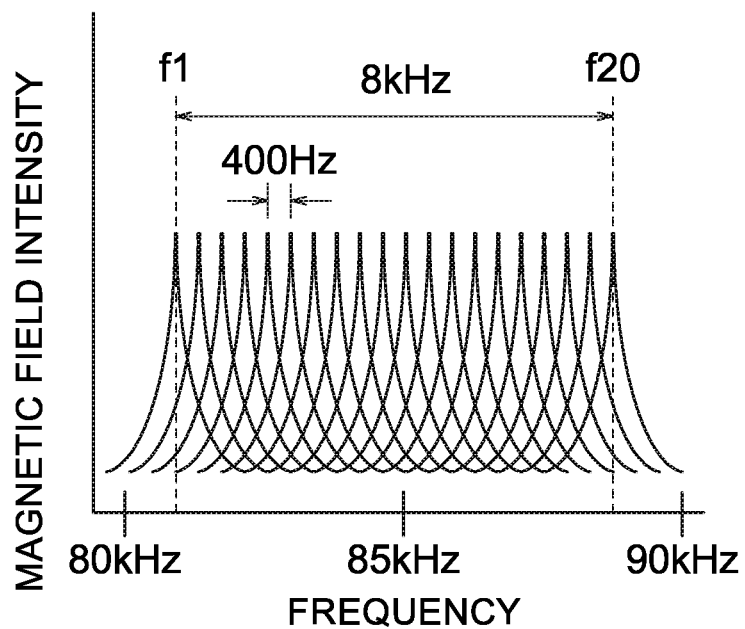

FIGS. 2A and 2B are graphs for explaining the frequency hopping. FIG. 2A is a graph illustrating the relationship between a frequency and a magnetic field intensity in a case where the frequency hopping is not performed, namely, when electric power transmission is performed only in one frequency. It is assumed that the electric power transmission is being performed only in 85 kHz in the example of FIG. 2A. Hence a graph having one peak (whose the magnetic field intensities are high) at a point of 85 kHz is illustrated.

FIG. 2B is a graph illustrating the relationship between the frequency and the magnetic field intensity in a case where the frequency hopping is performed, namely, when the electric power transmission is performed in a plurality of frequencies. It is assumed that the electric power transmission is being performed in twenty frequencies with 85 kHz at the center in the example of FIG. 2B. Hence a graph having twenty peaks (whose the magnetic field intensities are high) is illustrated.

A value by which the frequency shifts in the case of the frequency hopping will hereinafter be referred to simply as a shift value. Numbers are given in an ascending order of shift values. An i-th (i is an integer equal to or larger than 1) shift value is assumed to be represented as $f_i$. That is, a first shift value $f_1$ is the minimum shift value, $f_i$ is the i-th smallest shift value, and $f_{i+1} > f_i$ holds. Further, the number of the shift value will be referred to as a shift number. In the example of FIG. 2B, the shift number is 20.

In the frequency hopping, the frequency shifts from any shift value to any different shift value at some timing. The shifting is performed many times, and thereby the spread spectrum processes and the intensity of the leakage magnetic field decreases. In the examples of FIG. 2B, a range from the minimum shift value $f_1$ to the maximum shift value $f_{20}$ is about 8 kHz, and it can thus be said that the frequency has spread by about 8 kHz. The range from the minimum shift value to the maximum shift value will be referred to as a spread bandwidth. Further, a difference in frequency for each time of change in frequency, namely a difference ($f_{i+1} - f_i$) between the frequency before the change and the frequency after the change will be referred to as a shift width.

In the present embodiment, it is assumed that the frequency is shifted by cyclically repeating the shifting in an ascending order (an order from the minimum shift value toward the maximum shift value) and the shifting in a descending order (an order from the maximum shift value toward the minimum shift value). It is also assumed that the shift width is fixed.

Figure 3:
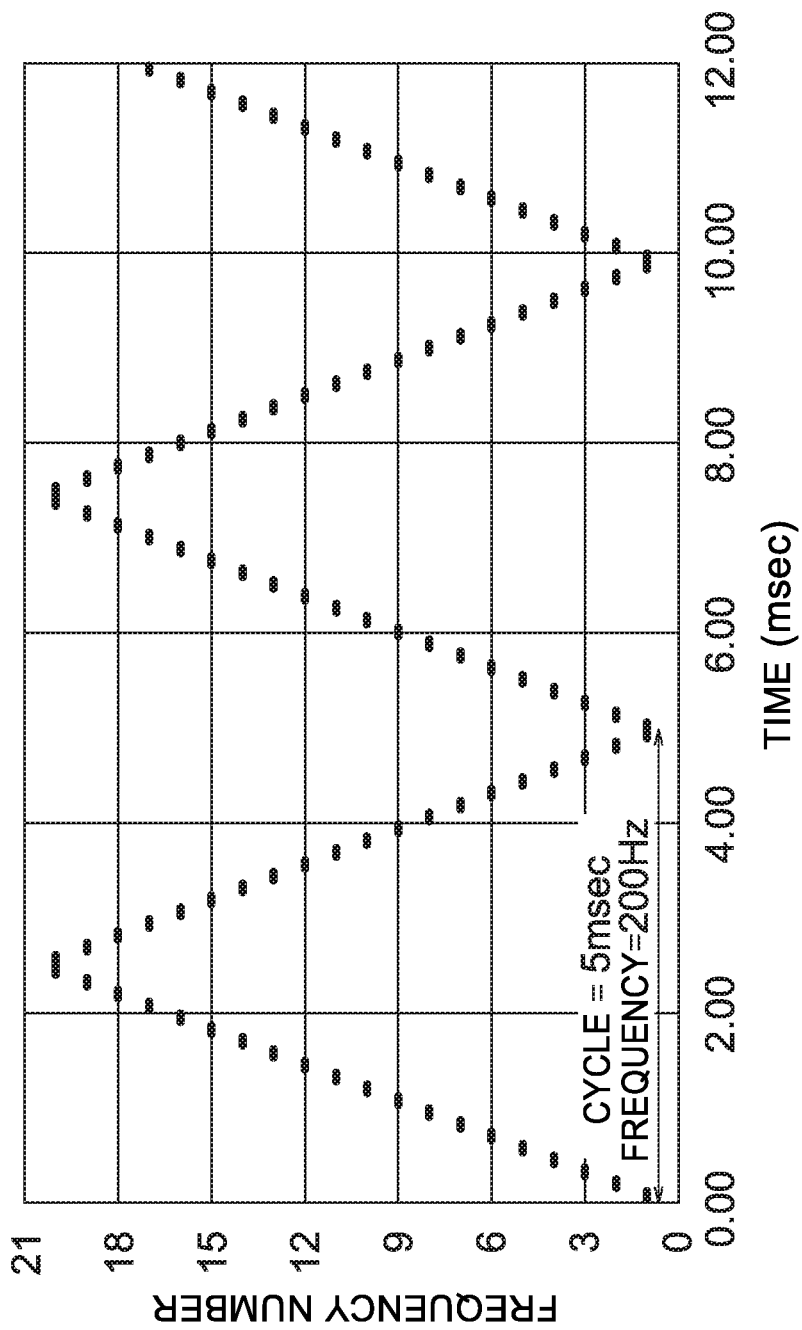
FIG. 3 is a graph illustrating an example of shifting of a frequency by the frequency hopping.

FIG. 3 is a graph illustrating an example of the shifting of the frequency by the frequency hopping. In FIG. 3, the horizontal axis represents time, and the vertical axis represents a shift value number. As in the example of FIG. 2B, the shift values from $f_1$ to $f_{20}$ exist. In the example of FIG. 3, the frequency first shifts in the ascending order (sequentially from $f_1$ toward $f_{20}$) and then shifts in the descending order (sequentially from $f_{20}$ toward $f_1$).

The shift value at the start of the frequency hopping may be any shift value. The shifting may be performed first in the descending order or may be performed first in the ascending order. For example, the frequency hopping may be started with the shift value $f_5$ and may then shift to $f_6$ or shift to $f_4$.

In this manner, the graph of the shifting in the descending order and the ascending order has a triangular shape, and such a shifting status is thus defined as "shifting in a triangular waveform." Incidentally, the shape of the shifting is not limited to the triangular waveform.

Figure 4:
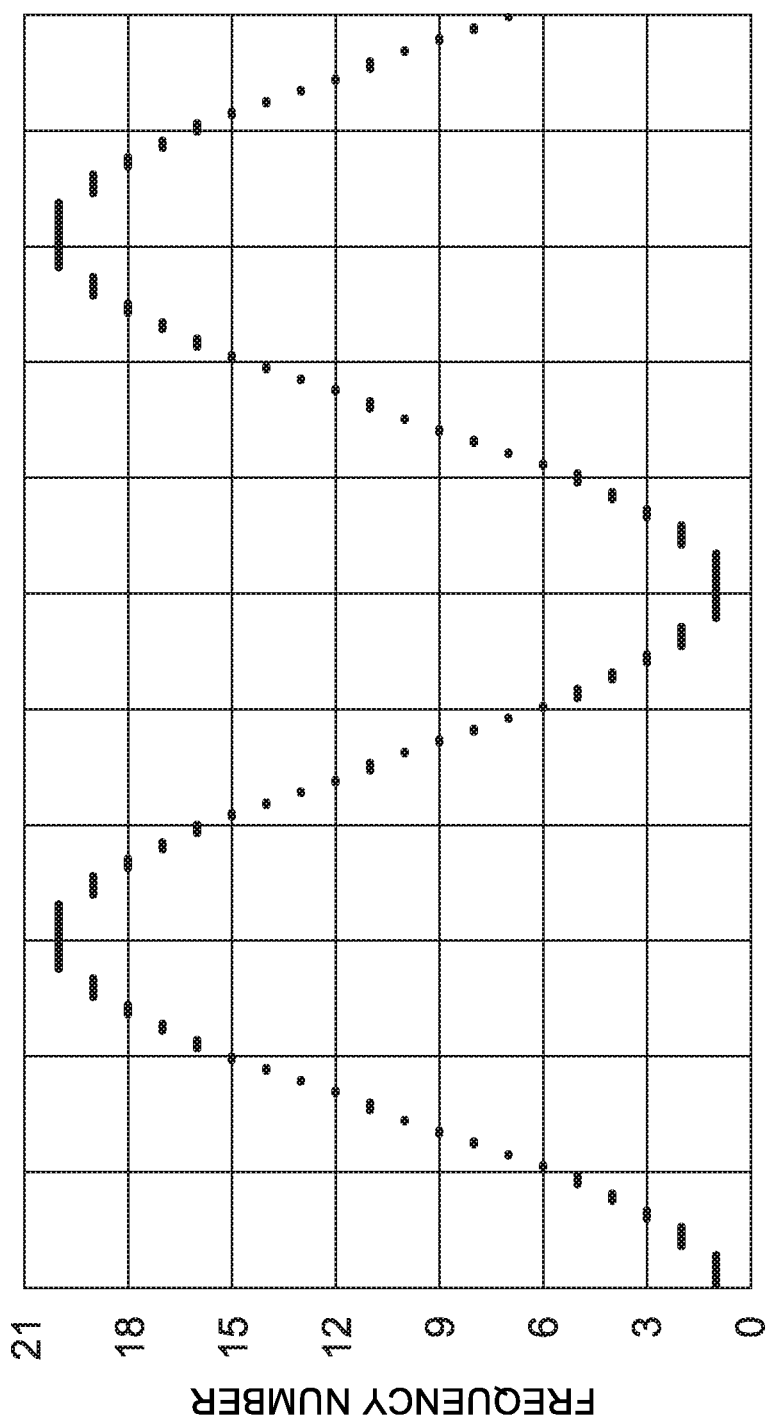
FIG. 4 is a graph illustrating another example of the shifting of the frequency by the frequency hopping.

FIG. 4 is a graph illustrating another example of the shifting of the frequency by the frequency hopping. FIG. 4 illustrates a graph having a generated sine waveform in a simulating way. When the sustained time at each of specific shift values is made longer than the sustained time at the other shift values in the shifting in the descending order and the ascending order, the shifting in such a sine waveform is given. Alternatively, when a specific shift value is successively set in a case where the frequency hopping is being performed on the basis of a shift rule defining the order of shifting, shifting in a waveform similar to the above sine waveform is given. For example, when the order of shifting is defined as being $f_{19}, f_{20}, f_{20}, f_{19}$ in the shift rule, $f_{20}$ is sustained twice as long as the other frequency. Thus, the shifting in the pseudo sine waveform may be given.

In the cyclic shifting as in FIGS. 3 and 4, one cycle is from the start point to the end point, the start point being at which the frequency shifts from the shift value $f_{i+1}$ or $f_{i-1}$ to the shift value and the end point being at which the frequency again shifts from the same shift value $f_{i+1}$ or $f_{i-1}$ to the shift value $f_i$. An example of one cycle is from the time at which the frequency shifts from the shift value $f_{11}$ to the shift value $f_{12}$ to the time at which the frequency again shifts from the shift value $f_{11}$ to the shift value $f_{12}$. That cycle will hereinafter be referred to as a frequency hopping cycle.

Power in the case of performing such frequency hopping is the same as power in the case of not performing the frequency hopping on a long-term basis. Therefore, power per frequency (power density) is smaller in the case of performing the frequency hopping than in the case of not performing the frequency hopping. By performing the frequency hopping, the power energy spreads with a plurality of frequencies to reduce the power density measured as the leakage magnetic field. The effect of reduction in leakage magnetic field (leakage magnetic field reduction effect) by the frequency hopping will be referred to as a spread spectrum effect. The spread spectrum effect by the frequency hopping of cyclic shifting as in FIGS. 3 and 4 is disclosed in Non Patent Literature (J. Balcell, el al., "EMI Reduction in Switched Power Converters Using Frequency Modulation Techniques", IEEE Trans. on Electromagnetic compatibility, 2005, Vol. 47, No. 3, PP 569-576) as a technique of suppressing a harmonic-wave leakage electromagnetic field of a digital clock for a computer. It is described that the optimum cycle for the frequency shifting is determined by a resolution bandwidth (resolution bandwidth: RBW) of the measurement instrument used for measurement of the leakage electromagnetic field. The optimum cycle is mostly 1/RBW.

It may occur that when the frequency hopping is performed in a high-frequency band, an expected spread spectrum effect cannot be obtained. For example, it has been found that when the cyclic frequency hopping is performed in the 85-Hz band in the example of FIG. 2B, the leakage magnetic field of the fundamental wave can be reduced, but the leakage magnetic field of the harmonic wave cannot be reduced.

The leakage magnetic field is measured with a device complying with the standard of CISPR (international special committee on radio interference) and capable of measuring the leakage magnetic field. That device will hereinafter be referred to simply as a measurement device. A setting for that measurement device is changed in accordance with a frequency band to be used. In the CISPR standard, it is defined that when a frequency band concerning measurement is a band A from 9 kHz to 150 kHz, a resolution bandwidth to be set in the measurement instrument is from 100 Hz to 300 Hz. It is also defined that a reference band concerning this resolution bandwidth is 200 Hz. It is also defined that when the frequency band concerning measurement is a band B from 150 kHz to 30 MHz, a resolution bandwidth is from 8 Hz to 10 Hz. It is also defined that a reference band concerning that resolution bandwidth is to be 9 Hz. Incidentally, the above resolution bandwidths are bandwidths based on a so-called 6 dB point defined by CISPR.

When both frequency bands of the fundamental wave and the harmonic wave are included in the band A or the band B, the spread spectrum effect can be obtained in both the fundamental wave and the harmonic wave. However, when one of the frequency bands of the fundamental wave and the harmonic wave is the band A and the other is the band B, the optimum cycle in which the spread spectrum effect can be obtained is different therebetween because of the difference in corresponding resolution bandwidth. When the cycle is set in accordance with one of the optimum cycles of the fundamental wave and the harmonic wave, the cycle deviates from the other of the optimum cycles. Therefore, strong effect of spreading power to each frequency can be obtained only in one of the fundamental wave and the harmonic wave.

For example, when the fundamental wave is the 85-kHz band, a third harmonic wave is a 255-kHz band, and a fifth harmonic wave is a 425-kHz band. Accordingly, the resolution bandwidth corresponding to the fundamental wave is about 200 Hz, while the resolution bandwidth corresponding to the third harmonic wave and the fifth harmonic wave is about 9 kHz, and the difference therebetween is as large as more than a digit. Hence the difference in optimum cycle is also more than a digit, and in the same shift cycle, the spread spectrum effect can be obtained only in either the fundamental wave or the harmonic wave.

Thus, it may occur that the spread spectrum effect can be obtained only in either the fundamental wave or the harmonic wave. Therefore, the present embodiment receives which one of the fundamental wave and the harmonic wave is a target, and performs the frequency hopping suitable for the wave as the target. It is thereby possible to obtain the spread spectrum effect in the wave as the target.

The inner configuration of the electric power transmission device 1 will be described.

The AC power source 11 supplies an AC current to the AC-DC converter 12. The AC power source 11 may be a three-phase power source or a single-phase power source. A power factor correction circuit, a rectifier, and the like may be connected to the AC power source 11. The AC-DC converter 12 converts the supplied AC current to a DC current. The DC current is then transmitted from the AC-DC converter 12 to the power transmitter 15.

The storage 13 stores one or more set values concerning the frequency hopping. That one or more set value will hereinafter be referred to as a parameter set. The parameter set is not particularly limited so long as being required for execution of the frequency hopping. For example, when a shift value, a shift rule (shift pattern), and a sustained time from shifting to the next shifting are included in the parameter set, the frequency can be controlled so as to shift to the next shift value determined on the basis of the shift rule each time the sustained time elapses. Further, a shift width, a shift number, a spread bandwidth, a frequency hopping cycle, and the like are stored, and the power transmission controller 14 may determine the shift value from these set values.

Incidentally, the parameter set may not include a set value which is required for execution of the frequency hopping but which is fixed. For example, when the shift pattern is fixed in the triangular waveform and a change from the outside is not accepted, the shift pattern may not be included in the parameter set.

Incidentally, the parameter set stored in the storage 13 may be rewritable. There may be cases where a value in the parameter set is prefer to be changed on the basis of the measured intensity of the leakage magnetic field at the time of executing the electric power transmission. In such a case, rewriting can be performed immediately.

The parameter set is assumed to be classified using classification bands (the band A and band B described above). That is, the storage 13 stores a parameter set with respect to the band A and a parameter set with respect to the band B. In other words, the storage 13 stores a parameter set with respect to the frequency band corresponding to the resolution bandwidth of about 200 Hz and a parameter set with respect to the frequency band corresponding to the resolution bandwidth of about 9 kHz. Hereinafter, the parameter set with respect to the frequency band corresponding to the resolution bandwidth of about 200 Hz will be referred to as a first parameter set, and the parameter set with respect to the frequency band corresponding to the resolution bandwidth of about 9 kHz will be referred to as a second parameter set.

Incidentally, the resolution bandwidth may be classified more finely to give three or more parameter sets.

Figure 5A:
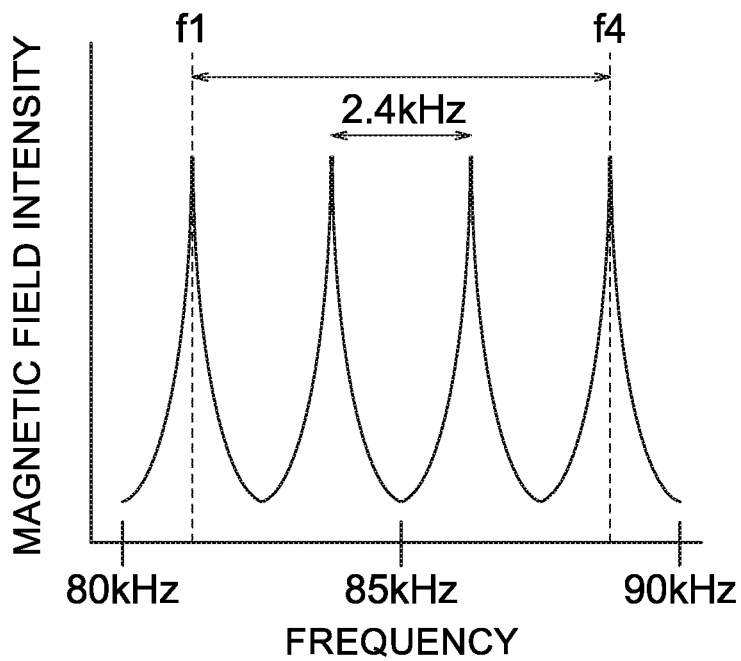
FIGS. 5A and 5B are graphs for explaining a second parameter set.
Figure 5B:
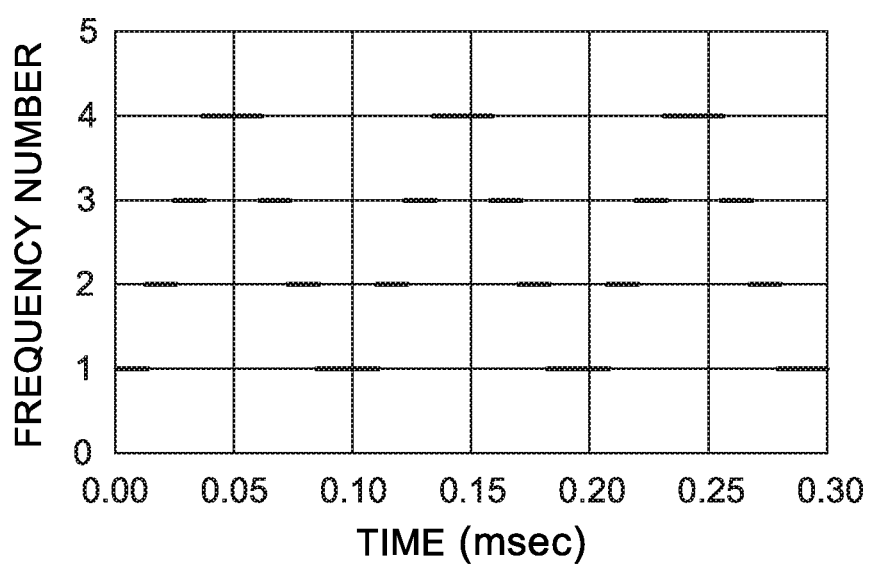

FIGS. 5A and 5B are graphs for explaining the second parameter set. FIG. 5A illustrates shift values and the like concerning the second parameter set. FIG. 5B illustrates shifting of the frequency by frequency hopping in the second parameter set. Incidentally, the shift value concerning the first parameter set has already been illustrated in FIG. 2A and the shifting of the frequency by the frequency hopping in the first parameter set has already been illustrated in FIG. 2B.

As illustrated in FIG. 5A, the spread bandwidth in the second parameter set needs to be made larger than that in the first parameter set. Further, the shift number in the second parameter set needs to be smaller than that in the first parameter set. Therefore, when the shift width is fixed, the shift width in the second parameter set needs to be made larger than that in the first parameter set.

For example, a frequency bandwidth considered to be standardized in an electric passenger car is currently from 79 kHz to 90 kHz. In this case, the first parameter set is used for the fundamental wave, and the second parameter set is used for the harmonic wave. Even when the frequency hopping is performed using the spread bandwidth of about 10 kHz, the frequency can be spread with a width only three times as large, 30 kHz, in the third harmonic wave and the frequency can be spread with a width only five times as large, 50 kHz, in the fifth harmonic wave. As described above, in the CISPR standard, the harmonic wave in that frequency band is measured with the resolution bandwidth of about 9 kHz, so that the width of the spread in the third harmonic wave is only three times as large and the width of the spread in the fifth harmonic wave is only about fifth times as large.

As described above, when the frequency is to be spread with a width k (k is a positive number) times as large as that of n-th (n is a positive integer) harmonic wave, a frequency bandwidth of (a reference band for the corresponding resolution bandwidth)×k/n is required. The resolution bandwidth corresponding to the second parameter set is larger than the resolution bandwidth corresponding to the first parameter set. Therefore, the spread bandwidth in the second parameter set needs to be larger than that in the first parameter set.

Further, the shift number in the second parameter set is difficult to make larger than that in the first parameter set. When the frequency is shifted in the triangular waveform, the same shift value appears twice in one cycle, and all shift values are thus used in a half cycle. Therefore, the half cycle is the same as the sustained time with respect to all the shift values. The minimum sustained time with respect to one frequency is considered as being one cycle ($1/f_c$) of a center frequency $f_c$ which is a frequency at the center of the spread bandwidth. Hence, when the shift number is expressed by Num and the cycle of the shift value is expressed by 1/RBW, ($\frac{1}{2}$)×(1/RBW)≥_($1/f_c$)×Num holds, and the shift number needs to be smaller than $f_c/(2\times RBW)$. Therefore, the second parameter set with a larger RBW value has a smaller shift number than the first parameter set.

For example, as in the example of FIG. 5A, when the center frequency $f_c$ is 85 kHz and the RBW of the harmonic wave is 9 kHz, the shift number is an integer smaller than 85/(2×9), namely 4 or smaller. Hence the spread spectrum processes with four shift values in the 85-kHz band, and it is thus necessary to take a wide frequency interval.

As illustrated in FIG. 5A, the second parameter set is stored into the storage 13 as, for example, a shift width of 2.4 kHz, a shift number of 4, a shift pattern of a triangular waveform, a sustained time of 12.13 μsec, and a cycle of 97 μsec.

Figure 6:
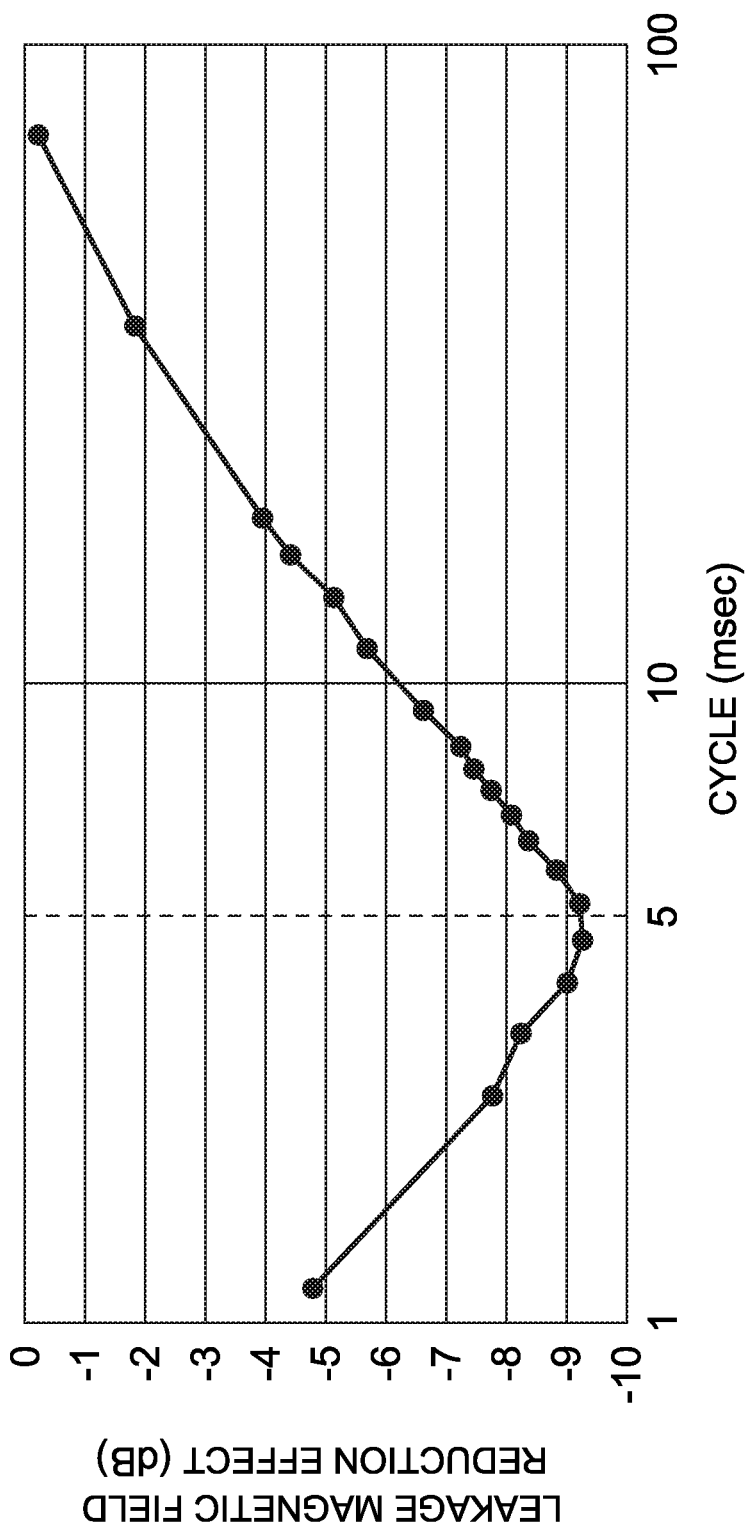
FIG. 6 is a graph illustrating the relationship between a cycle and a leakage magnetic field reduction effect.

Incidentally, the frequency hopping cycle is preferably set so as to substantially match the reciprocal of the reference band for the corresponding resolution bandwidth. FIG. 6 is a graph illustrating the relationship between the cycle and the leakage magnetic field reduction effect. The horizontal axis represents a cycle of frequency hopping, performed on a frequency that corresponds to the resolution bandwidth of about 200 Hz by using twelve shift values with a shift width fixed to 400 Hz. The vertical axis represents a value of the leakage magnetic field reduction effect in that cycle. Around a frequency hopping cycle of 5 msec, the graph is at the minimum, showing that the leakage magnetic field reduction effect is obtained most. It is found therefrom that when the frequency hopping cycle is substantially matched with the reciprocal of the reference band for the resolution bandwidth corresponding to the target frequency, a favorable reduction effect can be obtained.

Hence the cycle included in the first parameter set is preferably about 5 msec (1/200 Hz), and the cycle included in the second parameter set is preferably about 111 μsec (1/9 kHz). In FIG. 5A, the sustained time for one frequency is set to 12.13 μsec, making the cycle of the shift value be 97 μsec. Hence the cycle of the shift value substantially matches the preferably cycle described above.

When an effective range for the leakage magnetic field reduction effect is set to be a range to a value about 3 dB smaller than the maximum value (in FIG. 6, a range below −7 dB of the leakage magnetic field reduction effect), the cycle is set so as to be included in a range from one fourth of the reciprocal of the reference band to twice of the reciprocal of the reference band for the first resolution bandwidth (that is, the range is between 1/(4 RBW) and 2/RBW).

Figure 7:
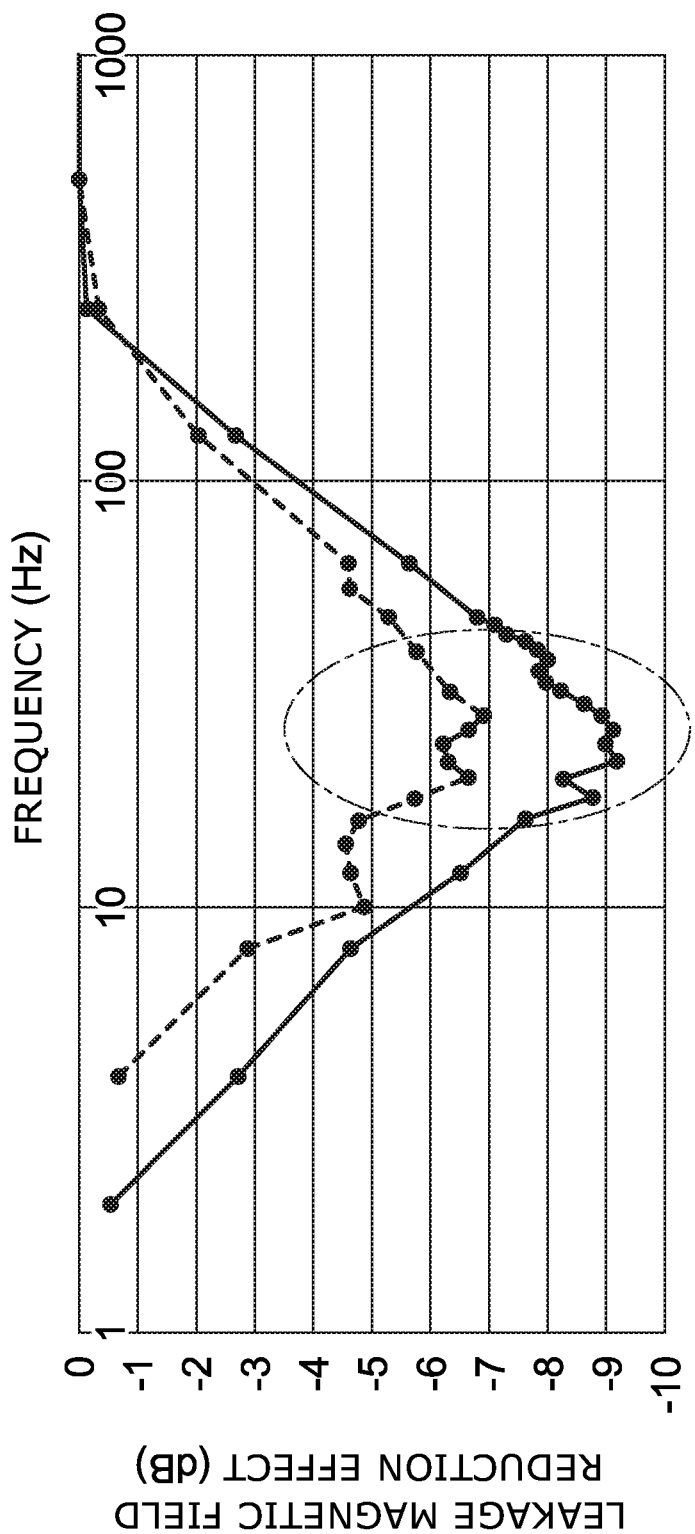
FIG. 7 is a graph illustrating a decrease in the leakage magnetic field reduction effect by the frequency hopping.

FIG. 7 is a graph illustrating a decrease in the leakage magnetic field reduction effect by the frequency hopping. The horizontal axis represents the frequency and the vertical axis represents the leakage magnetic field reduction effect. The leakage magnetic field reduction effect becomes larger and the leakage magnetic field is reduced more as the negative value becomes larger (as the graph goes down). A dotted-line graph indicates the leakage magnetic field reduction effect in the case of using six shift values with a shift width fixed to 400 kHz. In this case, the spread bandwidth is 2.4 GHz. A solid-line graph indicates the leakage magnetic field reduction effect in the case of using six shift values with a shift width fixed to 800 kHz. The spread bandwidth in this case is 4.8 GHz, which is twice of the frequency band concerning the solid-line graph.

As illustrated in FIG. 7, the leakage magnetic field reduction effect in the 4.8 GHz frequency band is mostly 3 dB higher than the leakage magnetic field reduction effect in the 2.4 GHz frequency band. The effective range for the leakage magnetic field reduction effect has been set to the range to the value about 3 dB smaller than the maximum value, and this is because the effect equal to or larger than a half of the spread bandwidth can be obtained when the decrease is held within 3 dB. Therefore, the cycle may be set to a range from one fourth of the reciprocal of a reference band for the corresponding resolution bandwidth to twice of the reciprocal of the reference band.

The power transmission controller 14 acquires the first parameter set or the second parameter set from the storage 13. A method for specifying the parameter set to be acquired may be set as appropriate. For example, the parameter set may be specified on the basis of an index for determining the acquirement. For example, the first parameter set may be acquired when the index value is 0, and the second parameter set may be acquired when the index value is 1. Alternatively, the frequency band may be shown as the index value, the power transmission controller 14 may determine which band, the band A or the band B, the frequency band corresponds to, and the parameter set concerning the classification band determined as the corresponding band may be acquired. When there is presumed to be a difference in the resolution bandwidth between the fundamental wave and the harmonic wave, the fundamental wave or the harmonic wave may be shown as the index value. In this manner, even when there is a difference in the resolution bandwidth concerning the measurement between the fundamental wave and the harmonic wave, it is possible to perform appropriate frequency hopping.

The index is made rewritable by reception of an input from a user. When the spread spectrum effect cannot be obtained in one of the fundamental wave and the harmonic wave, the user rewrites the index, and the frequency hopping is thereby performed for the one as the target. Thus, even when the spread spectrum effect cannot be obtained in either the fundamental wave or the harmonic wave, the target is switched to the wave in which the spread spectrum effect cannot be obtained, so that it is possible to obtain the spread spectrum effect in the target wave.

The index may be previously stored into the storage 13, and the power transmission controller 14 may first acquire the index from the storage 13 and may then acquire the parameter set corresponding to the index.

The power transmission controller 14 controls the power transmitter 15 such that the frequency hopping based on the acquired parameter set is performed. How to control the power transmitter 15 may be set as appropriate. For example, the power transmission controller 14 may transmit a clock signal as it is to the power transmitter 15 to specify the shift timing. Alternatively, the clock signal may be divided and a signal in a cycle for activating an inverter 1512 in the power transmitter 15, described later, may be generated and transmitted to specify the shift timing. The shift value may be previously transmitted to the power transmitter 15 or may be transmitted each time the shifting is performed.

The power transmitter 15 generates a magnetic field with a desired frequency by control of the power transmission controller 14. Specifically, the radio frequency current generator 151 generates a high-frequency signal at a specified frequency. The power transmission coil 152 generates a magnetic field by the radio frequency (high-frequency) current flowing therethrough. That is, the frequency of the radio frequency current is the same as the frequency of the magnetic field.

Figure 8:
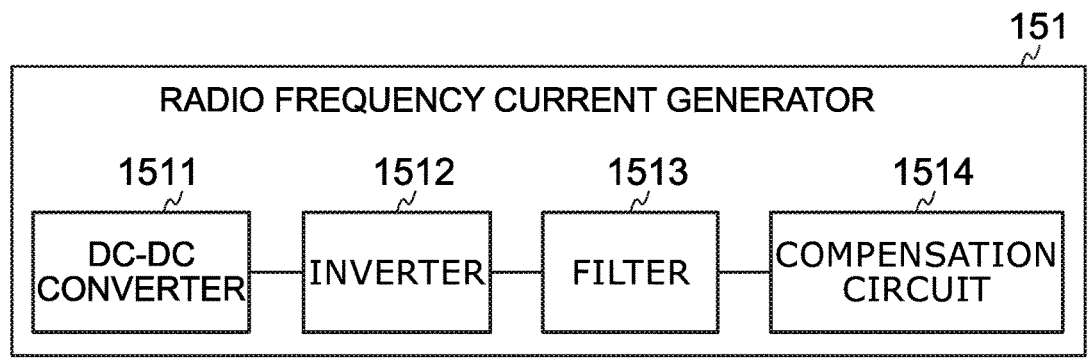
FIG. 8 is a diagram illustrating an example of an inner configuration of a radio frequency current generator.

The radio frequency current generator 151 may be achieved in a circuit. The radio frequency current generator 151 may include, for example, an inverter, a rectifier, a power factor correction circuit (PFC), a voltage conversion circuit, and the like. FIG. 8 is a diagram illustrating an example of the inner configuration of the radio frequency current generator. The radio frequency current generator 151 in FIG. 8 includes a DC-DC converter 1511, the inverter 1512, a filter 1513, and a compensation circuit 1514. Incidentally, the configuration of the radio frequency current generator 151 is not limited to the example of FIG. 8.

The DC-DC converter 1511 controls (boosts or drops) an input DC current to a desired voltage. The voltage value is controlled in this manner to adjust an amount of power transmitted to the electric power reception device 2.

The inverter 1512 converts the input DC current to an AC current with the specified frequency at the specified timing. Accordingly, the generation of the radio frequency current and the frequency hopping are performed.

The filter 1513 suppresses an unnecessary harmonic wave of the radio frequency current output from the inverter 1512. When the unnecessary harmonic wave is suppressed by the filter 1513, the intensity of the leakage magnetic field can be reduced. However, the harmonic wave becomes larger with increase in the transmitted power. The contactless electric power transmission has been used for charging of electric passenger cars, and the electric power transmission is expected to grow continuously. Therefore, high-performance filtering has been required with increase in transmission power, and problems such as an increase in size of the filter and an increase in cost of the device are assumed to occur. Therefore, performing the frequency hopping as in the present embodiment is more preferable than that the filter 1513 only adjusts the intensity of the leakage magnetic field.

The compensation circuit 1514 compensates the radio frequency current for the purpose such as improving a power factor and reducing a phase difference between the radio frequency current and the voltage before the radio frequency current is transmitted to the power transmission coil 152. The compensation circuit 1514 is made up of a capacitor, for example. The capacitor may be connected in series to the power transmission coil 152 or may be connected in parallel thereto. The radio frequency current generated and adjusted thus is transmitted to the power transmission coil 152.

The power transmission coil 152 generates a magnetic field by the radio frequency current flowing therethrough. When the magnetic field generated from the power transmission coil 152 reaches the power reception coil 211, mutual coupling occurs between the power transmission coil 152 and the power reception coil 211. Thereby, the power reception coil 211 receives power from the power transmission coil 152. In this manner, the power is transmitted in a contactless manner.

As types of coils, there are a solenoid type and a spiral type which are classified on the basis of placement of a winding and a ferrite core, but either type may be used.

Thus, the electric power transmission device 1 can transmit power to the electric power reception device 2 while performing the frequency hopping by using the parameter set in accordance with the frequency as the target for the frequency hopping.

The electric power reception device 2 receives power generated in the power reception coil 211 due to mutual induction. The type of the power reception coil 211 may be either type similar to the power transmission coil 152.

Figure 9:
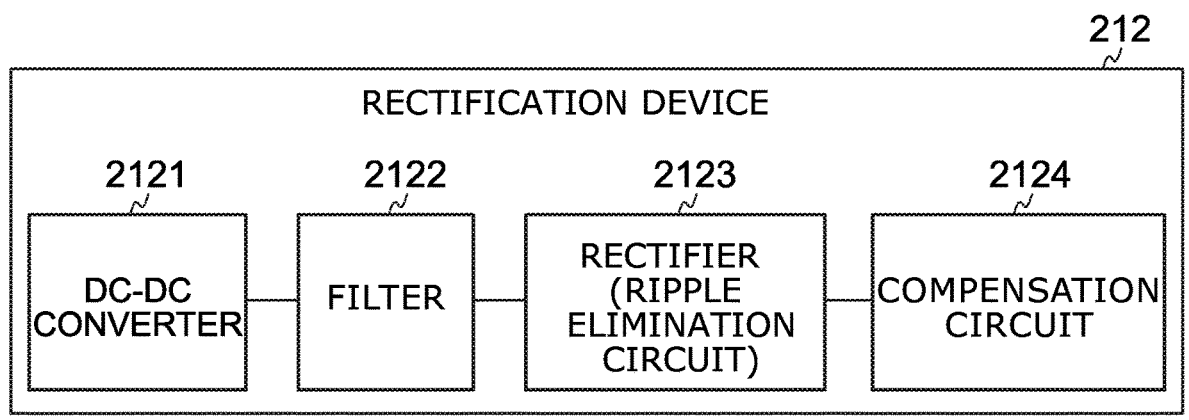
FIG. 9 is a diagram illustrating an example of an inner configuration of a rectification device.

The rectification device 212 serves to rectify the radio frequency current from the power reception coil 211 and allows the rectified current to flow through a battery, another device, and the like. FIG. 9 is a diagram illustrating an example of the inner configuration of the rectification device. The rectification device 212 includes a compensation circuit 2121, a filter 2122, a rectification circuit (ripple elimination circuit) 2123, and a DC-DC converter 2124. Incidentally, the configuration of the rectification device 212 may only be able to rectify a radio frequency current and is not limited to the example of FIG. 9.

The radio frequency current from the power reception coil 211 is transmitted to the rectifier 2123 via the compensation circuit 2121 and the filter 2122. The compensation circuit 2121 may also be made up of a capacitor or the like, and the capacitor may be connected in series to the power reception coil 211 or may be connected in parallel thereto. The filter 2122 may also be made up of a capacitor, an inductor, or a combination of these. The filter 2122 may not be provided when the magnetic field intensity to electromagnetic interference is sufficiently low with respect to an acceptable value.

The rectifier 2123 may be made up of, for example, a full-bridge diode or the like. A current after the rectification contains many ripple components. Thus, the rectifier 2123 may include a ripple elimination circuit made up of a capacitor, an inductor, or a combination of these, so as to eliminate ripples. The DC-DC converter 2124 performs voltage conversion after rectification of the rectifier 2123. The rectification device 212 performs rectification, transformation, and the like to the current, and then the current is transmitted to another component such as the battery. The electric power reception device 2 can receive the power in such a manner.

As described above, according to the present embodiment, even when the spread spectrum effect cannot be obtained in either the fundamental wave or the harmonic wave, the target is switched to the wave in which the spread spectrum effect cannot be obtained, so that it is possible to obtain the spread spectrum effect in the target wave.

The leakage magnetic field in the contactless electric power transmission system needs to be verified as to whether to satisfy the acceptable value in a test room such as a shield room and needs to be measured in a final installation site. When it becomes clear that the acceptable value is not satisfied in the shield room or the installation site, it is necessary to take measures on site so as to make the leakage magnetic field equal to or lower than the acceptable value.

The target for reduction in the leakage magnetic field is the fundamental wave and the harmonic wave. It is also necessary to make adjustment as to which wave the reduction by the spread spectrum process is to be applied to in the environment of the shield room or the installation site, while conducting the measurement. According to the present embodiment, switching can be made from the fundamental wave to the harmonic wave or from the harmonic wave to the fundamental wave, so as to immediately deal with such a situation as above.

Second Embodiment

Figure 10:
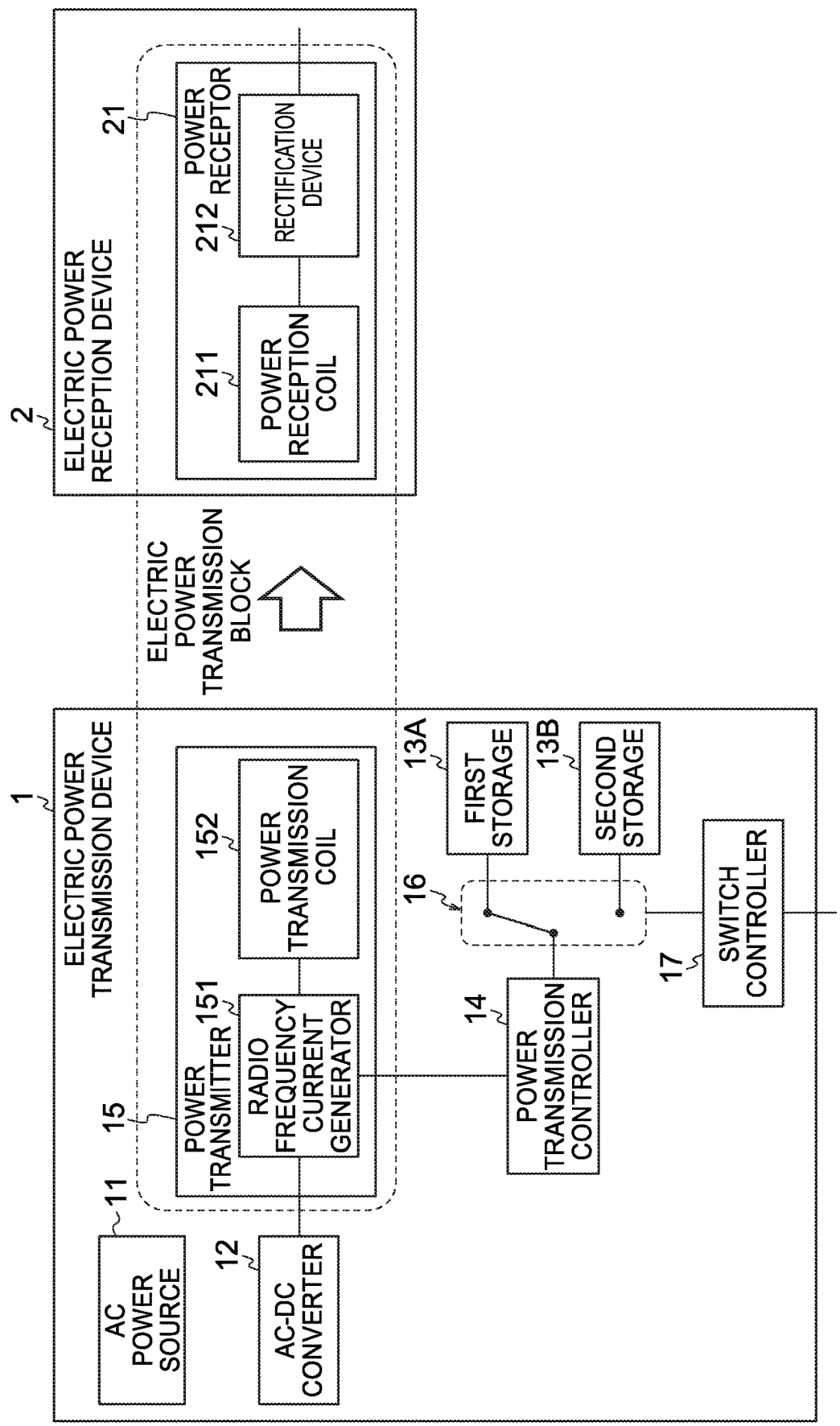
FIG. 10 is a block diagram illustrating an example of an electric power transmission system according to a second embodiment.

FIG. 10 is a block diagram illustrating an example of an electric power transmission system according to a second embodiment. The second embodiment is different from the first embodiment in that the storage 13 of the first embodiment is divided into a plurality of units and that a switch 16 and a switch controller are provided a new. Description of similarities to the first embodiment will be omitted.

The storage 13 of the first embodiment is divided for each resolution bandwidth. The divided storage stores a parameter set for use in each corresponding resolution bandwidth. The example of FIG. 10 illustrates a first storage 13A for storing the first parameter set and a second storage 13B for storing the second parameter set.

The switch 16 is connected to the plurality of storages 13 and the power transmission controller 14 and electrically connects between the power transmission controller 14 and either of the plurality of storages 13. When the switch controller 17 receives an input from the outside, the switch controller 17 controls the switch 16 so as to connect between the power transmission controller 14 and the storage 13 corresponding to the input. For example, the switch 16 may be switched by reception of an electric signal. Alternatively, the switch controller may simply be a switch lever. In that case, the user can switch the parameter set to be used just by switching the switch lever.

Alternatively, information concerning such as a resolution bandwidth and a frequency as the target for the frequency hopping may be input into the switch controller, and the switch controller 17 may determine the storage 13 to be connected from the input pieces of information.

The power transmission controller 14 is electrically connected to only one storage 13 and acquires the parameter set stored in the electrically connected storage 13. Thus, in the present embodiment, the power transmission controller 14 does not determine which parameter set is to be acquired, and the index described above may be omitted. The fact that the power transmission controller 14 controls the power transmitter on the basis of the acquired parameter set is similar to that in the first embodiment.

As described above, according to the second embodiment, the connection destination of the power transmission controller 14 is switched by the switch, which thereby makes it easy to switch the parameter set to be used.

Third Embodiment

In the embodiments described so far, the target for the frequency hopping is switched to the wave in which the spread spectrum effect is required when the resolution bandwidths corresponding to the fundamental wave and the harmonic wave are different because the spread spectrum effect cannot be obtained in either the fundamental wave or the harmonic wave. In contrast, in the present embodiment, the frequency hopping is executed such that the spread spectrum effect can be obtained in both the fundamental wave and the harmonic wave, even when the resolution bandwidths corresponding to the fundamental wave and the harmonic wave are different.

Figure 11:
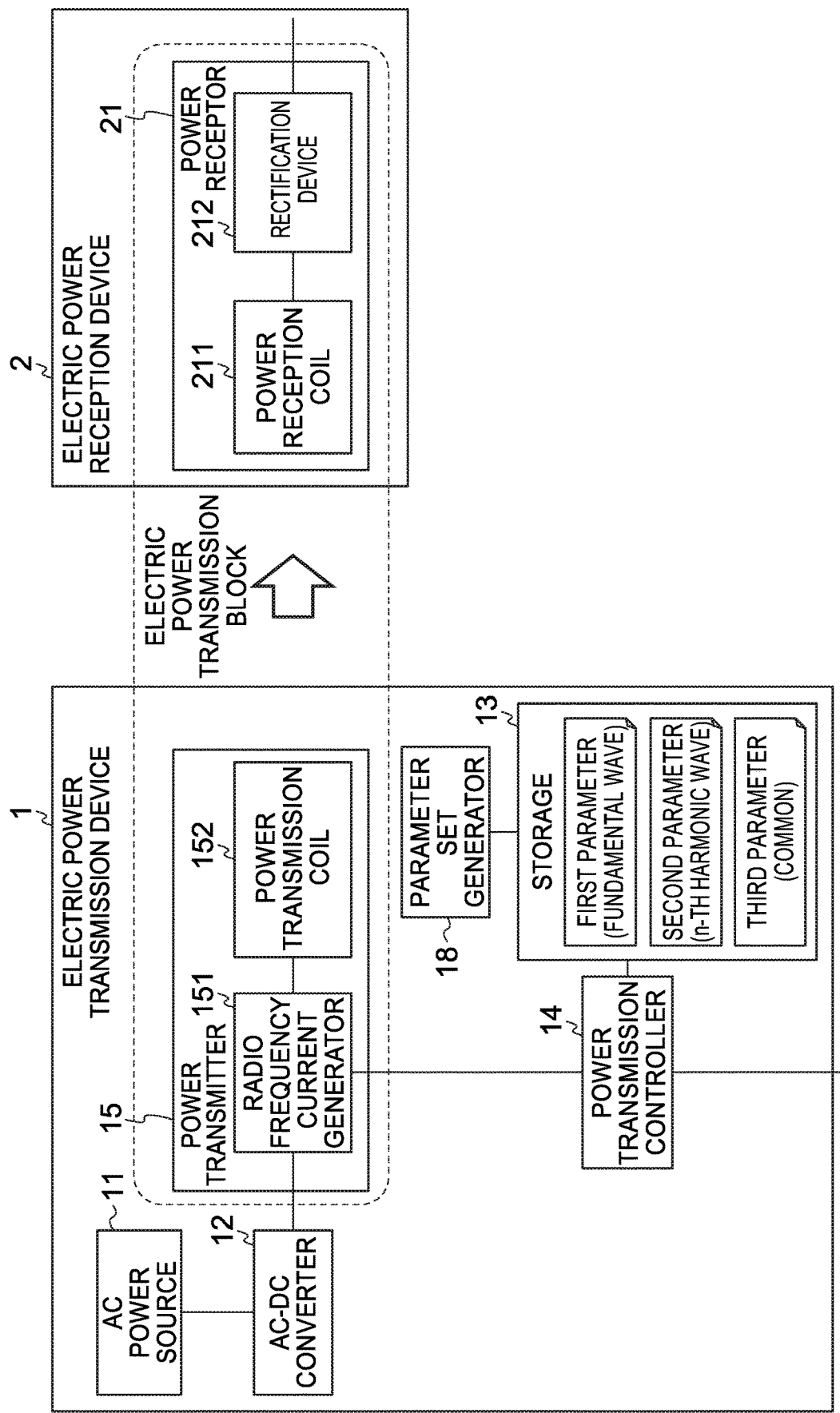
FIG. 11 is a block diagram illustrating an example of an electric power transmission system according to a third embodiment.

FIG. 11 is a block diagram illustrating an example of an electric power transmission system according to a third embodiment. The third embodiment is different from the first embodiment in that the electric power transmission device further includes a parameter set generator 18. Description of similarities to the first embodiment will be omitted.

The parameter set generator 18 calculates a parameter set, with which the spread spectrum effect can be obtained both in the fundamental wave and the harmonic wave. That parameter set will be referred to as a third parameter set, and frequency hopping by using the third parameter set will be referred to as mixed spread.

As described above, it is preferable that the frequency hopping cycle substantially match the reciprocal of the reference band for the corresponding resolution bandwidth. Hence, about 5 msec (1/200 Hz) is suitable for the cycle of the frequency hopping by using the first parameter set, while about 0.1 msec (1/9 kHz) is suitable for the cycle of the frequency hopping by using the second parameter set. The difference in the suitable cycle therebetween is more than a digit. Therefore, when the frequency hopping is performed such that the shift value is shifting in a cycle of about 0.1 msec and is also shifting in a cycle of about 5 msec, it is possible to obtain the spread spectrum effect on both the fundamental wave and the harmonic wave even in the case where the resolution bandwidths corresponding to the fundamental wave and the harmonic wave are different.

Figure 12C:
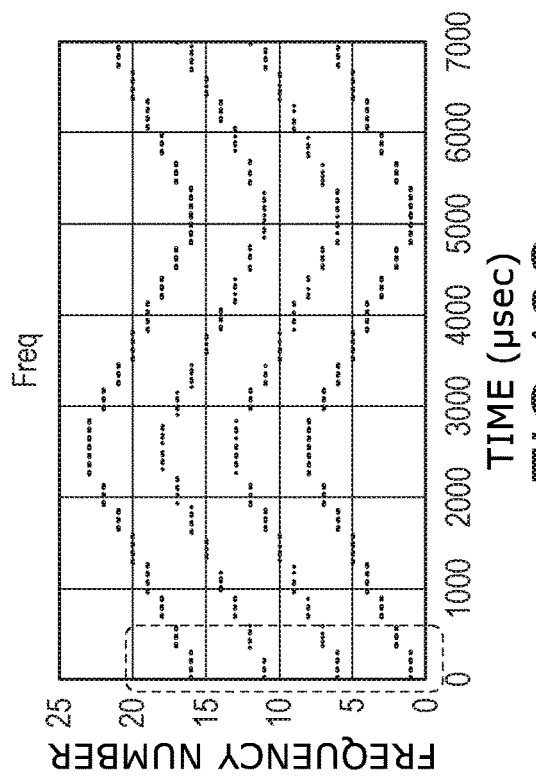
FIGS. 12A to 12D are graphs for explaining a third parameter set.
Figure 12D:
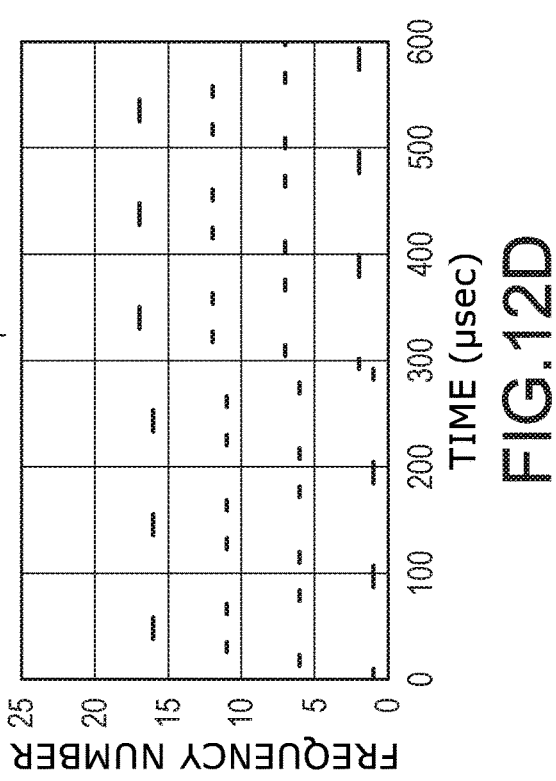
Figure 12A:
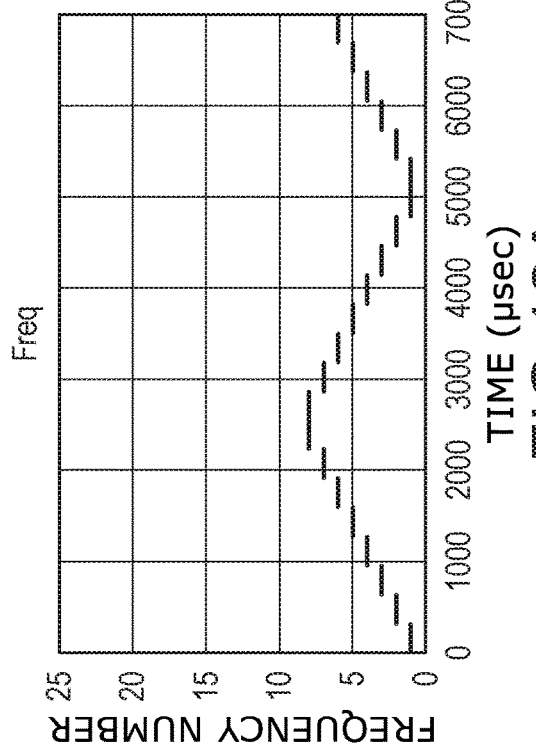
Figure 12B:
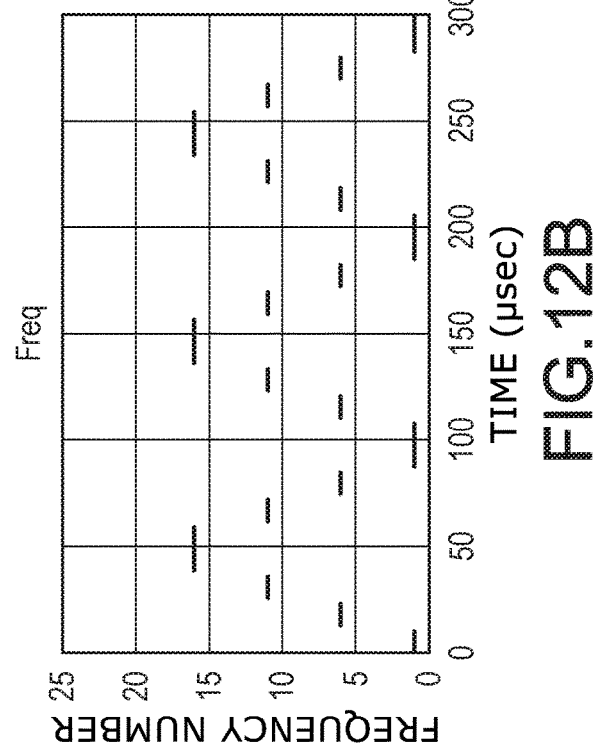

FIGS. 12A to 12D are graphs for explaining the third parameter set. FIG. 12A is a diagram illustrating the shifting of the frequency in the frequency hopping by using the first parameter set (long-cycle frequency shifting). FIG. 12B is a diagram illustrating the shifting of the frequency in the frequency hopping by using the second parameter set (short-cycle frequency shifting). In the long-cycle frequency hopping in FIG. 12A, shift values from $f_{N1}$ to $f_{N8}$, with a shift width fixed to 300 Hz, are used. The cycle of the long-cycle frequency hopping is about 5 msec (5000 μsec). In the short-cycle frequency hopping in FIG. 12B, shift values from $f_{H1}$ to $f_{H4}$, with a shift width fixed to 1200 Hz, are used. The cycle of the long-cycle frequency hopping is about 0.1 msec (100 μsec). Incidentally, $f_{N1}$ and $f_{H1}$ are assumed to be the same value. The shift width is exactly four times, so $f_{H1}=f_{N1}$, $f_{H2}=f_{N6}$, $f_{H3}=f_{N11}$, and $f_{H4}=f_{N16}$.

FIG. 12C is a graph illustrating the shifting of the frequency in the mixed spread. When the long-cycle frequency shifting as in FIG. 12A is synthesized with the short-cycle frequency shifting as illustrated in FIG. 12B, frequency shifting as in FIG. 12C can be performed in which the long-cycle frequency shifting is superimposed as an offset on the short-cycle frequency shifting. As illustrated in FIG. 12C, shift values in the mixed spread are from $f_{A1}$ to $f_{A23}$.

FIG. 12D illustrates a portion surrounded by a dotted frame in FIG. 12C. As illustrated in FIG. 12D, initially, the frequency cyclically shifts within a combination of $\{f_{A1}, f_{A6}, f_{A11}, f_{A16}, f_{A16}, f_{A11}, f_{A6}, \text{and } f_{A1}\}$. This shifting is the same as the short-cycle shifting. That cycle is about 100 μsec (0.1 msec), and the shift width for each time is 1200 Hz.

Thereafter, at the point when a certain time has elapsed, the frequency cyclically shifts within a combination of $\{f_{A2}, f_{A7}, f_{A12}, f_{A17}, f_{A17}, f_{A12}, f_{A7}, f_{A2}\}$. Thereafter, at the point when a certain time has elapsed again, the frequency cyclically shifts within a combination of $\{f_{A3}, f_{A8}, f_{A13}, f_{A18}, f_{A18}, f_{A13}, f_{A8}, f_{A3}\}$. In this manner, each time a certain time elapses, the component in the combination, namely the number of the shift value to be used increases by one. When an integer i is used, the i-th combination $F_{Ai}$ can be represented by $F_{Ai}=\{f_{Ai}, f_{Ai+5}, f_{Ai+10}, f_{Ai+15}, f_{Ai+15}, f_{Ai+10}, f_{Ai+5}, f_{Ai}\}$. The shift value increases up to the eighth combination $F_{A8}\{f_{A8}, f_{A13}, f_{A18}, f_{A23}, f_{A23}, f_{A18}, f_{A13}, f_{A8}\}$, and after the eighth combination $F_{A8}$, the combination shifts in a descending order. Thus, the shifting of the combination $F_{Ai}$ is repeated cyclically. This shifting of the combination is the same as the long-cycle shifting. That cycle is about 5000 μsec (5 msec), and the shift width for each time of combination is 300 Hz.

Thus, the frequency shifting illustrated in FIGS. 12C and 12D have a component for shifting in the short cycle of about 0.1 msec (components in the combination $F_{Ai}$) and a component for shifting in the long cycle of about 5 msec (combination $F_{Ai}$. Thus, even when the resolution bandwidths corresponding to the fundamental wave and the harmonic wave are different, the spread spectrum effect on the harmonic wave is obtained by the short cycle of about 0.1 msec, and the spread spectrum effect on the fundamental wave is obtained by the long cycle of about 5 msec. Therefore, by using the third parameter set having both the short cycle and the long cycle as above, the spread spectrum effect can be obtained in both the fundamental wave and the harmonic wave.

On the basis of the first parameter set and the second parameter set, the parameter set generator 18 determines the third parameter set for performing the frequency hopping such that the frequency shifts as in FIG. 12C. After generation of the synthesized wave using the frequency shifting by using the first parameter set and the frequency shifting by using the second parameter set, the third parameter set may be derived from that synthesized wave. However, a simple synthesized wave may cause a defect, and hence the following conditions are to be satisfied.

A first condition is to make the short-cycle spread bandwidth larger than the long-cycle spread bandwidth as in the embodiments described so far. The short-cycle spread bandwidth is an interval from the minimum shift value to the maximum shift value within the same combination, and from $f_{Ai}$ to $f_{Ai+15}$. The long-cycle spread bandwidth is an interval from a j-th (j is an integer equal to or larger than 1) shift value of the first combination to an j-th shift value of the combination with the frequency having increased most. That is, in the example of FIG. 12, any of intervals from $f_{A1}$ to $f_{A8}$, from $f_{A6}$ to $f_{A13}$, from $f_{A11}$ to $f_{A18}$, and from $f_{A16}$ to $f_{A23}$.

A second condition is to make the short-cycle shift width smaller than the long-cycle shift width as in the embodiments described so far. The short-cycle shift width is 1200 Hz and the long-cycle shift width is 300 Hz in the examples of FIGS. 12A and 12B, and hence the shift values included in the first parameter set and the second parameter set may be used as they are in the examples of FIGS. 12C to 12D.

A third condition is to make the spread bandwidth by the mixed spread included in an acceptable bandwidth. This is because, even when the short-cycle spread bandwidth and the long-cycle spread bandwidth are included in the acceptable bandwidth, the spread bandwidth by the mixed spread is not necessarily included in the acceptable bandwidth. For example, the maximum shift value in the mixed spread is $f_{A23}$ which is the maximum value in the eighth combination $F_{A8}$. This $f_{A23}$ is a value obtained by adding a difference between the maximum shift value and the minimum shift value of the frequency hopping performed on the short cycle: $f_{H4}-f_{H1}(f_{N16}-f_{N1})$, to the maximum shift value $f_{N8}$ of the frequency hopping performed on the long cycle. Therefore, $f_{A23}=f_{N8}+f_{H4}-f_{H1}(f_{N8}+f_{N16}-f_{N1})$ holds. Accordingly, the total of the maximum shift value of the frequency hopping performed on the long cycle and the difference between the maximum shift value and the minimum shift value of the frequency hopping performed on the short cycle needs to be prevented from exceeding an upper limit of a bandwidth usable for the mixed spread.

Incidentally, a band which is about a half of the shift width may be provided as a margin (a band not to be used) at each end of the frequency band of the harmonic wave. In an assumed shift width (e.g., about 2 kHz) in the frequency hopping performed on the harmonic wave, a side lobe of a frequency spectrum becomes wider as the spread spectrum processes. Hence, the margin may be provided to prevent an affect by the side lobe. In that case, a value obtained by subtracting the margin from the upper limit of the frequency band of the harmonic wave becomes the upper limit of the maximum shift value in the mixed spread.

When the synthesized wave does not satisfy the above conditions, the parameter set generator 18 may change the parameter of the synthesized wave so as to satisfy the above conditions. The method for changing the parameter may be set in a freely selectable manner.

The parameter set generator 18 transmits the generated third parameter set to the storage 13. Thereby, the storage 13 stores the third parameter set. Incidentally, the third parameter set may be directly transmitted from the parameter set generator 18 to the power transmission controller 14.

When receiving an input so as to use the third parameter set, the power transmission controller 14 acquires the third parameter set from the storage 13 and controls the power transmitter 15 such that the frequency hopping based on the third parameter set is performed. The designation of third parameter set may be performed with the index shown in the first embodiment or by that the switch 16 connects the storage which stores only the third parameter set and the power transmission controller 14 as shown in the second embodiment. Thereby, it is possible to execute the frequency hopping such that the spread spectrum effect can be obtained in both the fundamental wave and the harmonic wave even when the resolution bandwidths corresponding to the fundamental wave and the harmonic wave are different.

Incidentally, the parameter set generator 18 has generated the third parameter set in the above. However, it can be assumed that the third parameter set is generated outside. In that assumption, the parameter set generator 18 may be omitted, or the storage 13 may store only the third parameter set.

As described above, according to the third embodiment, the third parameter set is generated, with which the spread spectrum effect can be obtained in both the fundamental wave and the harmonic wave. The frequency hopping is performed with the third parameter set, and thereby the effect of the spread spectrum process can be obtained in both the fundamental wave and the harmonic wave.

When the first to third parameter sets are stored in the storage 13, the user who executes electric power transmission can select the frequency hopping to be executed from three options: the frequency hopping on the fundamental wave; the frequency hopping on the harmonic wave; and the frequency hopping on both the fundamental wave and the harmonic wave. It is thereby possible to make it easier to perform adjustment in accordance with the test environment, the installation site, and the like.

Although each process in the present embodiment is assumed to be achieved in a dedicated circuit, the process regarding the circuit control, such as specifying the timing for change in frequency, may be achieved by the CPU executing a program stored in a memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electric power transmission device, comprising:
a power transmitter configured to generate a magnetic field;
a storage configured to store a first parameter set concerning frequency hopping performed on a first frequency band and a second parameter set concerning frequency hopping performed on a second frequency band; and
a power transmission controller configured to acquire one of the first parameter set and the second parameter set from the storage, and to control the power transmitter such that the frequency hopping is performed based on the acquired parameter set,
wherein:
the first frequency band is a band corresponding to a first resolution bandwidth for measuring a leakage magnetic field, and
the second frequency band is a band corresponding to a second resolution bandwidth that is intended for a higher band than the first resolution bandwidth.

2. The electric power transmission device according to claim 1, wherein the power transmission controller switches a parameter set to be acquired in accordance with an external input.

3. The electric power transmission device according to claim 1, wherein:
the storage comprises a first storage configured to store the first parameter set and a second storage configured to store the second parameter set,
the device further comprises a switch connected to the power transmission controller, the first storage, and the second storage,
the switch selectively electrically connects the power transmission controller to one of the first storage and the second storage, and
the power transmission controller acquires the parameter set stored in the one of the first storage or second storage electrically connected by the switch.

4. An electric power transmission system, comprising:
an electric power transmission device; and
an electric power reception device,
wherein:
the system transmits power in a contactless manner,
the electric power transmission device comprises:
a power transmitter configured to generate a magnetic field,
a storage configured to store a first parameter set concerning frequency hopping performed on a first frequency band and a second parameter set concerning frequency hopping performed on a second frequency band, and
a power transmission controller configured to acquire one of the first parameter set and the second parameter set, and to control the power transmitter such that the frequency hopping is performed based on the acquired parameter set,
the electric power reception device comprises a power receptor configured to generate a radio frequency current by using the magnetic field,
the first frequency band is a band corresponding to a first resolution bandwidth for measuring a leakage magnetic field, and
the second frequency band is a band corresponding to a second resolution bandwidth intended for a higher band than the first resolution bandwidth.

* * * * *